United States Patent
McClung et al.

(10) Patent No.: US 6,923,224 B1
(45) Date of Patent: Aug. 2, 2005

(54) CLOSURE AND VENT SYSTEM FOR CAPLESS FILLER NECK

(75) Inventors: Chad A. McClung, Connersville, IN (US); Jeffery Griffin, Connersville, IN (US); Lowell R. Bell, Indianapolis, IN (US)

(73) Assignee: Stant Manufacturing Inc., Connersville, IN (US)

( * ) Notice: Subject to any disclaimer, the term of this patent is extended or adjusted under 35 U.S.C. 154(b) by 15 days.

(21) Appl. No.: 10/895,593

(22) Filed: Jul. 21, 2004

Related U.S. Application Data (60) Provisional application No. 60/536,608, filed on Jan. 15, 2004.

(51) Int. Cl.[7] .................................................. B65B 1/04
(52) U.S. Cl. ................ 141/350; 220/86.2; 220/DIG. 33
(58) Field of Search ............................... 141/348–350, 141/301, 302; 220/86.2, DIG. 33

(56) References Cited

U.S. PATENT DOCUMENTS

| | | | |
|---|---|---|---|
| 3,580,414 A | 5/1971 | Ginsburgh et al. | |
| 3,730,216 A | 5/1973 | Arnett et al. | |
| 3,911,977 A | 10/1975 | Berger | |
| 3,938,564 A | 2/1976 | Jones | |
| 4,265,752 A | 5/1981 | O'Banion | |
| 4,714,172 A | 12/1987 | Morris | |
| 4,762,247 A | * 8/1988 | Temmesfeld | 220/303 |
| 4,898,395 A | 2/1990 | Kawase | |
| 4,977,936 A | 12/1990 | Thompson et al. | |
| 4,986,439 A | 1/1991 | Ott et al. | |
| 4,995,433 A | 2/1991 | Beicht et al. | |
| 5,022,433 A | 6/1991 | Jansky et al. | |
| 5,042,678 A | 8/1991 | Munguia | |
| 5,056,570 A | 10/1991 | Harris et al. | |
| 5,071,018 A | 12/1991 | Moore | |
| 5,195,566 A | 3/1993 | Ott et al. | |
| 5,238,034 A | 8/1993 | Corfitsen | |
| 5,271,438 A | 12/1993 | Griffin et al. | |
| D381,004 S | 7/1997 | Foltz | |
| 5,730,194 A | 3/1998 | Foltz | |
| 5,732,840 A | 3/1998 | Foltz | |
| D394,627 S | 5/1998 | Foltz | |
| D403,643 S | 1/1999 | Foltz | |
| D415,989 S | 11/1999 | Foltz | |
| 6,009,920 A | 1/2000 | Palvoelgyi et al. | |
| D429,678 S | 8/2000 | Foltz | |
| 6,189,581 B1 | 2/2001 | Harris et al. | |
| 6,315,144 B1 | 11/2001 | Foltz | |
| 6,338,362 B1 | 1/2002 | Gabbey et al. | |
| 6,443,195 B2 | 9/2002 | Palvoelgyi et al. | |
| 6,446,826 B1 | * 9/2002 | Foltz et al. | 220/86.2 |
| 6,546,972 B1 | 4/2003 | Foltz | |
| 6,679,396 B1 | 1/2004 | Foltz et al. | |
| 6,691,750 B1 | * 2/2004 | Foltz | 141/350 |
| 2003/0098304 A1 | 5/2003 | Foltz | |

* cited by examiner

*Primary Examiner*—Steven O. Douglas
(74) *Attorney, Agent, or Firm*—Barnes & Thornburg LLP (57) ABSTRACT

A filler neck closure assembly includes a housing formed to include a vent chamber arranged to receive a fuel-dispensing pump nozzle therein during fuel tank refueling. A flow control valve assembly is provided to regulate flow of ambient air and/or fuel vapor through the vent chamber.

31 Claims, 10 Drawing Sheets

CLOSURE AND VENT SYSTEM FOR CAPLESS FILLER NECK

This application claims priority under 35 U.S.C. § 119(e) to U.S. Provisional Application Ser. No. 60/536,608, filed Jan. 15, 2004, which is expressly incorporated by reference herein.

BACKGROUND

The present disclosure relates to a filler neck closure assembly for a vehicle fuel tank, and particularly to a filler neck closure for use in a capless fuel tank filler neck. More particularly, the present disclosure relates to closure seals and to pressure/vacuum-relief valves for use in a filler neck closure assembly.

A removable fuel cap with a sealing gasket is typically used to close the open end of a fuel tank filler neck. After an attendant fills the fuel tank and withdraws the pump nozzle from the filler neck, the fuel cap is attached to the filler neck so that the sealing gasket forms a seal between the fuel cap and the filler neck. Thus, the fuel cap closes the open end of the filler neck to block discharge of liquid fuel and fuel vapor from the fuel tank through the filler neck. Some fuel caps are provided with pressure-relief and vacuum-relief valves to permit some controlled venting of fuel vapors in the filler neck, while the fuel cap is mounted on the filler neck.

It has been observed that fuel caps are often lost or damaged over time and, as a result, the open end of the filler neck might not be closed and sealed in accordance with original equipment specifications during operation of the vehicle. Accordingly, a filler neck configured to "open" automatically as a fuel-dispensing pump nozzle is inserted into the filler neck during refueling and "close" automatically once the pump nozzle is withdrawn from the filler neck without requiring an attendant to reattach a fuel cap to the filler neck would be an improvement over many conventional capped filler neck systems. Although conventional fuel caps function to close filler necks in a satisfactory manner, it is thought that a capless filler neck could make vehicle refueling more convenient for consumers because no action other than inserting a pump nozzle into the outer end of the filler neck would be required to begin refueling a vehicle.

SUMMARY

According to the present disclosure, a filler neck closure assembly includes a nozzle-receiving housing associated with a vehicle fuel tank filler neck. The assembly also includes a partition arranged to create two vent chambers in the housing and a flow control valve assembly for regulating flow of ambient air and/or fuel vapor through the vent chambers.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIGS. 8–12 show an illustrative method of producing a closure comprising the appearance door and an overmolded seal on the appearance door;

DETAILED DESCRIPTION

Figure 1:
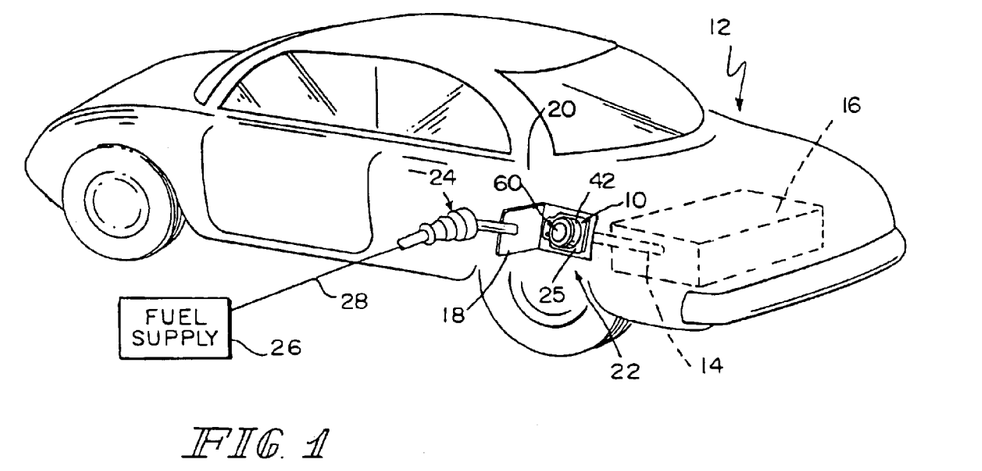
FIG. 1 is a perspective view showing an outer filler neck access door moved to an opened position relative to a vehicle body panel to expose an illustrative filler neck closure assembly coupled to a filler neck leading to a vehicle fuel tank and showing a fuel-dispensing pump nozzle coupled to a fuel supply and configured to be inserted into the filler neck closure assembly during vehicle refueling to discharge liquid fuel into the filler neck leading to the vehicle fuel tank.
Figure 2:
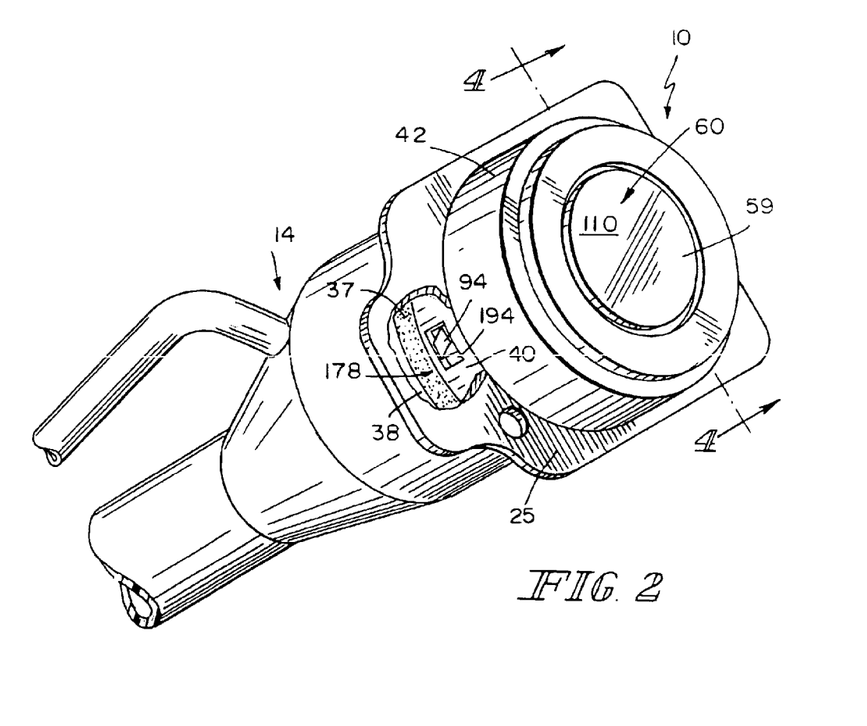
FIG. 2 is an enlarged perspective view of the filler neck closure assembly of FIG. 1 coupled to the filler neck and showing an outer shell formed to include an outer aperture, a pivotable appearance door closing the outer aperture, and a mounting bracket, with a portion broken away, to show one of the vent ports formed in a first embodiment of the filler neck closure assembly to allow ambient air to flow into an interior region of the assembly to reach a vacuum-relief valve and/or pressure-relief valve included in the assembly.

As shown in FIGS. 1 and 2, a filler neck closure assembly 10 is provided in a vehicle 12 normally to close a filler neck 14 extending from a fuel tank 16 onboard vehicle 12. During refueling, an outer filler neck access door 18 is moved relative to a vehicle body panel 20 to expose filler neck closure assembly 10 as shown, for example, in FIG. 1. Filler neck closure assembly 10 is located in a chamber 22 formed in vehicle 12 so that assembly 10 is "out of sight" when access door 18 is closed. A bracket 25 is used to support filler neck closure assembly 10 in chamber 22 as suggested in FIGS. 1 and 2. A fuel-dispensing pump nozzle 24 is coupled to a fuel supply 26 by a hose 28 and configured to be inserted into filler neck closure assembly 10 during vehicle refueling to discharge liquid fuel 29 into filler neck 14 as suggested in FIG. 6.

Figure 3:
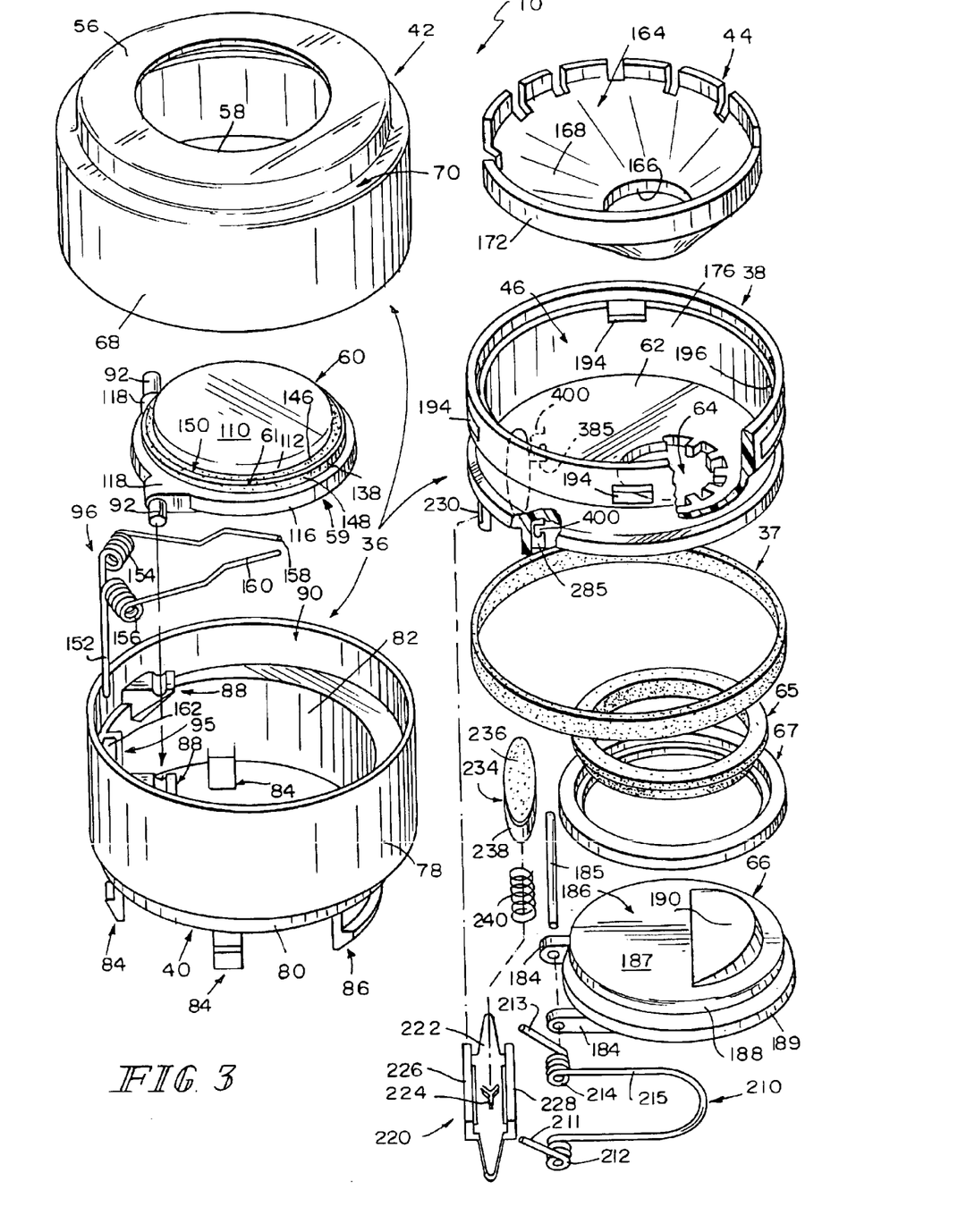
FIG. 3 is an exploded perspective view of the filler neck closure assembly of FIGS. 1 and 2 showing (in sequence top to bottom and left to right) an outer shell, a pivotable appearance door, a door-biasing spring, an outer body, a partition formed to include a funnel, a base that couples to the outer body to form an interior region containing the partition and defining vent ports of the type shown in FIG. 2, a large-diameter sealing gasket sized to mate with the base, a small-diameter annular seal sized to mate with a flapper door, a seal retainer, a pivot shaft, a flapper door, a door-biasing spring, and components included in an illustrative vacuum-relief valve assembly.
Figure 4:
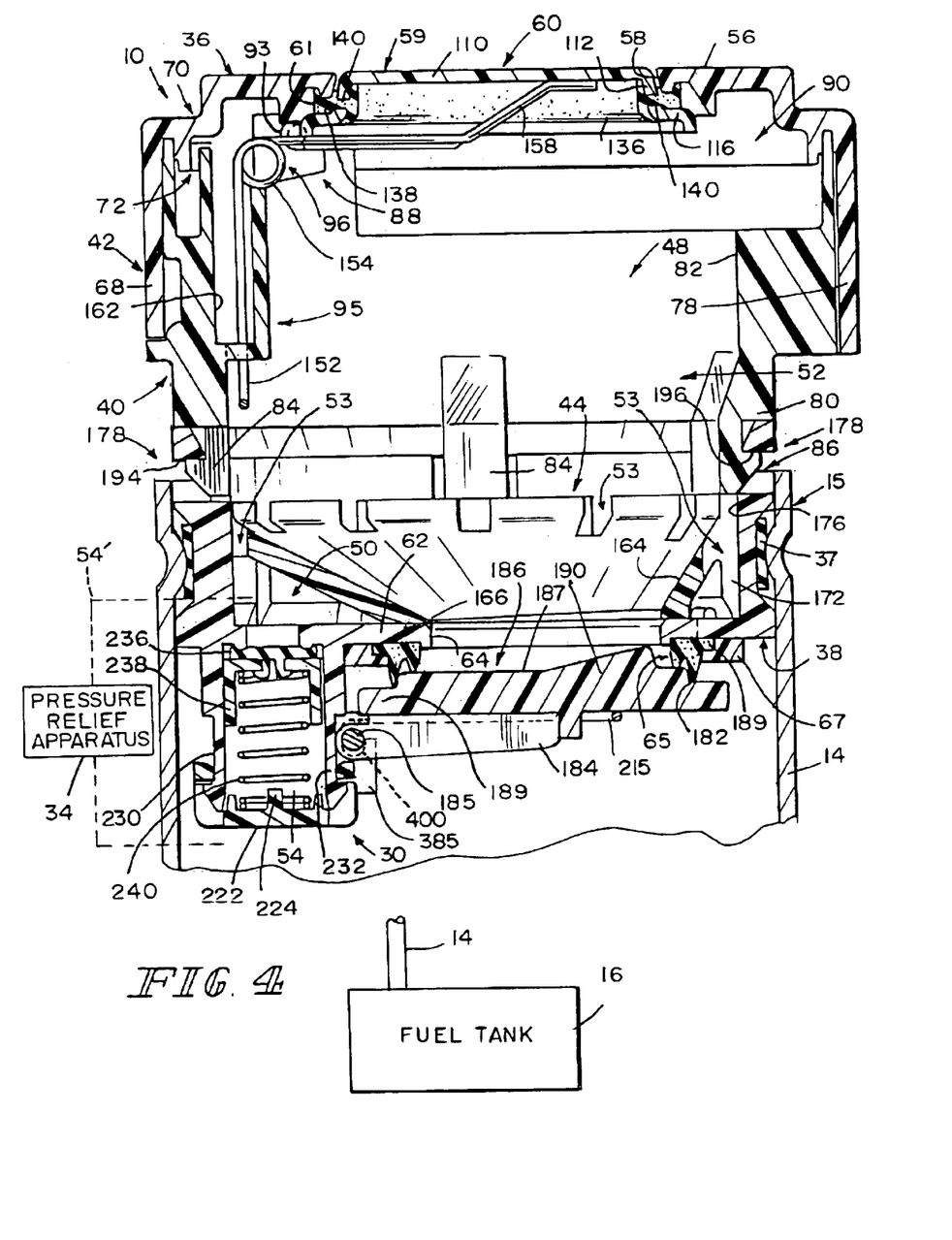
FIG. 4 is an enlarged sectional view taken along line 4—4 of FIG. 2 showing the appearance and flapper doors in their sealed, closed positions, the partition located in an interior region defined by the flapper door-carrying base and the appearance door-carrying outer body to divide that interior region into an inner vent chamber below the funnel included in the partition and an outer vent chamber above the funnel and in communication with the ambient air vent ports formed at a junction between the base and outer body and showing a pressure-relief apparatus for venting pressurized fuel vapor from the filler neck into the inner vent chamber and a vacuum-relief apparatus for admitting ambient air extant in the inner vent chamber into the filler neck.
Figure 5:
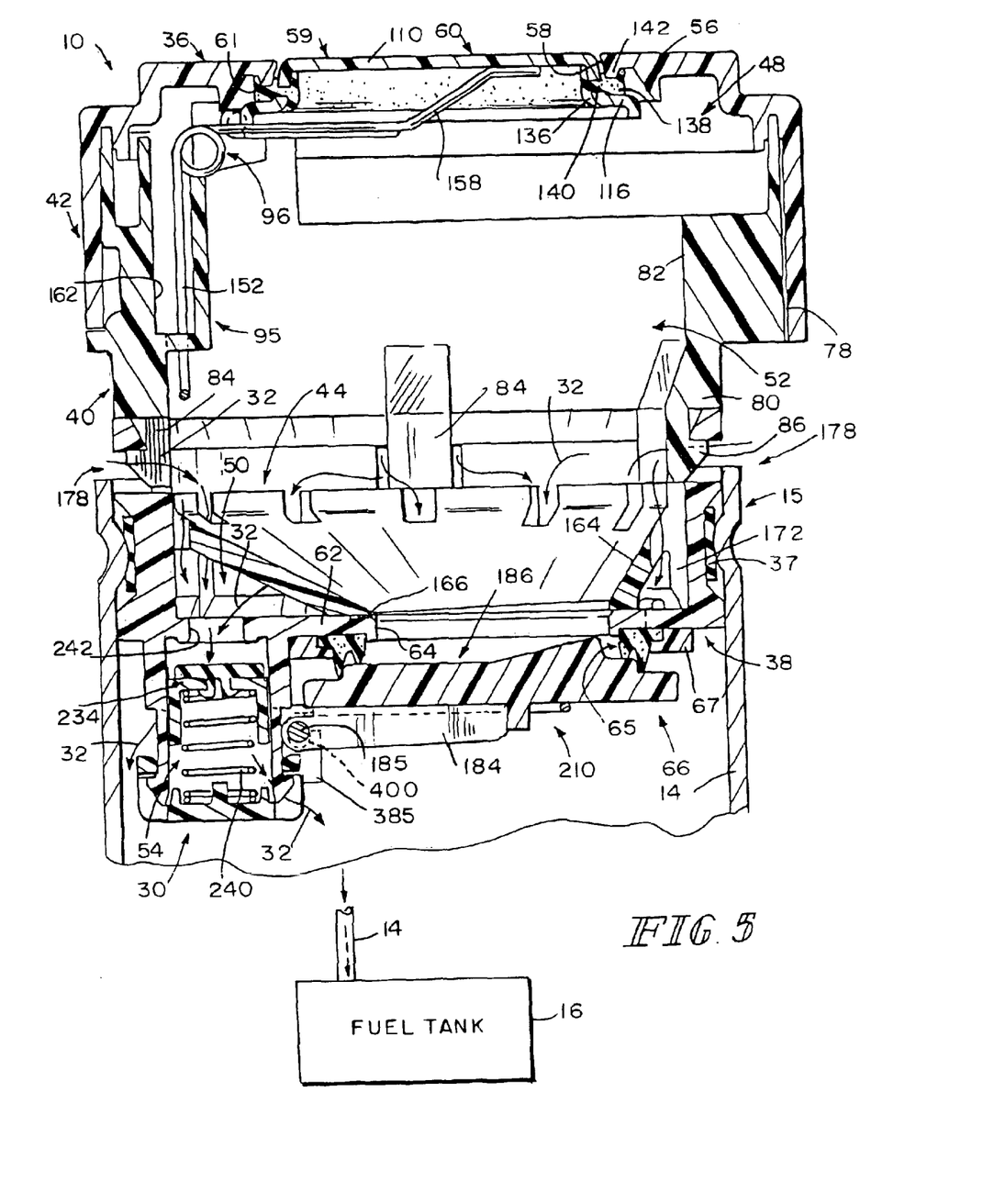
FIG. 5 is a sectional view similar to FIG. 4 showing movement of the vacuum-relief valve to an opened position to allow ambient air to flow into the upper vent chamber through the vent ports, then into the lower vent chamber through vent channels formed in the partition, and then past the opened vacuum-relief valve into the filler neck while the appearance and flapper doors remain closed to reach the fuel tank in response to development of predetermined "vacuum" conditions in the fuel tank.

Filler neck closure assembly 10 is assembled as shown, for example, in FIG. 4 using components illustrated in FIG. 3. In the illustrated embodiment, a vacuum-relief apparatus 30 is included in assembly 10 to provide means for admitting ambient air 32 into filler neck 14 as suggested, for example, in FIG. 5 whenever certain predetermined vacuum conditions develop in fuel tank 16 and filler neck 14. A pressure-relief apparatus 34 can be used (alone or in tandem with vacuum-relief apparatus 30) to discharge excess pressurized fuel vapor from filler neck 14 through assembly 10 to the surroundings.

As suggested in FIGS. 3 and 4, filler neck closure assembly 10 includes a housing 36 adapted to be coupled to a mouth 15 of filler neck 14 in the manner shown, for example, in FIG. 4. A sealing gasket 37 is interposed between housing 36 and filler neck 14 to establish a sealed connection therebetween.

In the illustrated embodiment, housing 36 comprises a base 38, an outer body 40 coupled to base 38, and an outer shell 42 coupled to outer body 40. Assembly 10 also includes a partition 44 mounted, for example, in a cavity 46 formed in base 38 to lie in an interior region 48 formed in housing 10 between base 38 and outer body 40. Partition 44 is arranged as shown, for example, in FIG. 4 to divide interior region 48 into an inner vent chamber 50 below partition 44 and an outer vent chamber 52 above partition 44. Partition 44 and base 38 cooperate to form channel means 53 for conducting air and/or fuel vapor between inner and outer vent chambers 50, 52 while partition 44 is mounted in interior region 48 to define inner and outer chambers 50, 52. Partition 44 is arranged to shield components defining vacuum-relief apparatus 30 and pressure-relief apparatus 34 from any contaminant material inadvertently introduced into outer vent chamber 52.

As suggested in FIG. 4, housing 36 also includes a vent passage 54 and/or 54' having an outer end opening into inner vent chamber 50 located in interior region 48 and an inner end adapted to open into fuel tank filler neck 14 when housing 36 is coupled to filler neck 14. A flow control valve assembly such as a vacuum-relief apparatus 30 or pressure-relief apparatus 34 can be placed in vent passage 54 or 54' to regulate flow of a gas (e.g., air or fuel vapor) through vent passage 54 of 54'.

Figure 6:
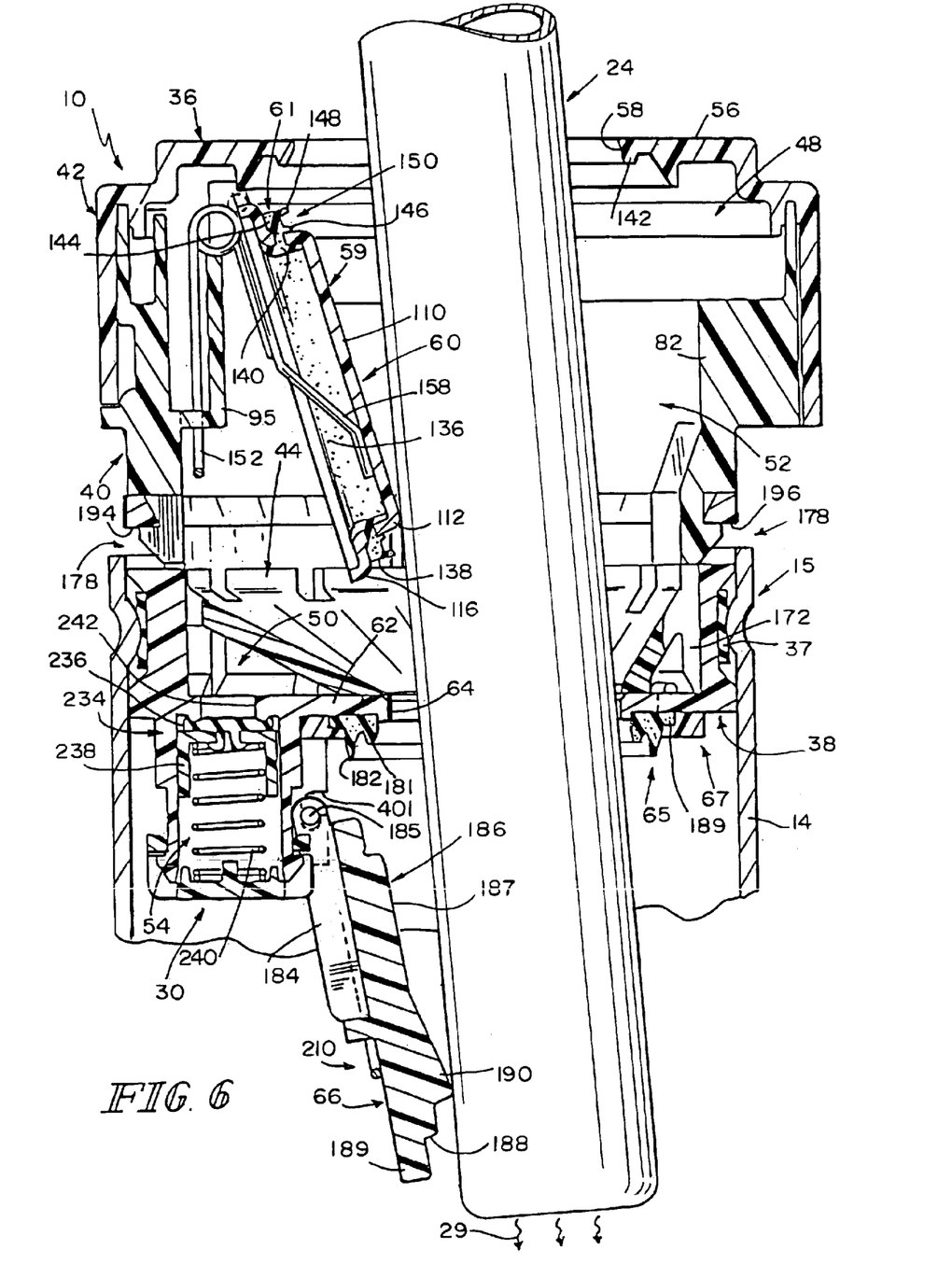
FIG. 6 is a sectional view similar to FIGS. 4 and 5 showing a pump nozzle passing through the nozzle-receiving aperture formed in the outer shell and through the nozzle-receiving apertures formed in the funnel and base while holding the spring-loaded appearance and flapper doors in opened positions.

As suggested in FIGS. 3, 4, and 6, housing 36 is adapted to be coupled to fuel tank filler neck 14 to receive fuel-dispensing pump nozzle 24 during refueling of fuel tank 16. Housing 36 includes a top wall 56 provided, for example, on outer shell 42 and formed to include an outer nozzle-receiving aperture 58 normally closed by outer closure 60. Outer closure 60 can be moved (e.g., pivoted) by pump nozzle 24 to assume an opened position during refueling as suggested in FIG. 6. Housing 36 also includes a bottom wall 62 provided, for example, on base 38 and formed to include an inner nozzle-receiving aperture 64 normally closed by flapper door 66. Flapper door 66 can be moved (e.g., pivoted) by pump nozzle 24 to assume an opened position during refueling as suggested in FIG. 6.

As suggested in FIGS. 3 and 4, outer closure 60 includes an appearance door 59 mounted for pivotable movement relative to outer body 40 and configured to carry a seal member 61. When outer closure 60 is moved to assume the closed position, appearance door 59 occludes outer nozzle-receiving opening 58 and seal member 61 establishes a sealed connection between top wall 56 of outer shell 42 and appearance door 59.

As also suggested in FIGS. 3 and 4, an annular seal 65 is configured to mate with flapper door 66 upon movement of flapper door 66 to assume the closed position. Seal retainer 67 is coupled (e.g., welded) to base 38 to retain annular seal 65 in a position surrounding inner nozzle-receiving opening 64 and engaging flapper door 66 upon movement of flapper door 66 to assume the closed position.

Partition 44 is arranged to divide interior region of 48 into outer and inner vent chambers 52, 50. Outer vent chamber 52 communicates with both outer and inner nozzle-receiving apertures 58, 64 as suggested in FIG. 4. Outer vent chamber 52 also defines a pump nozzle-receiving passageway adapted to receive pump nozzle 24 therein as suggested in FIG. 6 during movement of pump nozzle 24 through outer and inner nozzle-receiving apertures 58, 64 to move outer closure 60 and flapper door 66 to opened positions during fuel tank refueling. Inner vent chamber 50 communicates with vent passages 54, 54' as suggested in FIG. 4. Inner vent chamber 50 also communicates with outer vent chamber 52 via channel means 53.

Outer shell 42 includes an annular skirt 68 and an upper portion 70 having an L-shaped cross-section and interconnecting top wall 56 and skirt 68 as suggested in FIGS. 3 and 4. Means 72 is appended to an underside of upper portion 70 for coupling outer shell 42 to outer body 40. As suggested in FIG. 7, a lug 74 appended to skirt 68 fits into one of notches 76 formed in outer body 40 to fix rotary orientation of outer shell 42 in relation to outer body 40.

Figure 7:
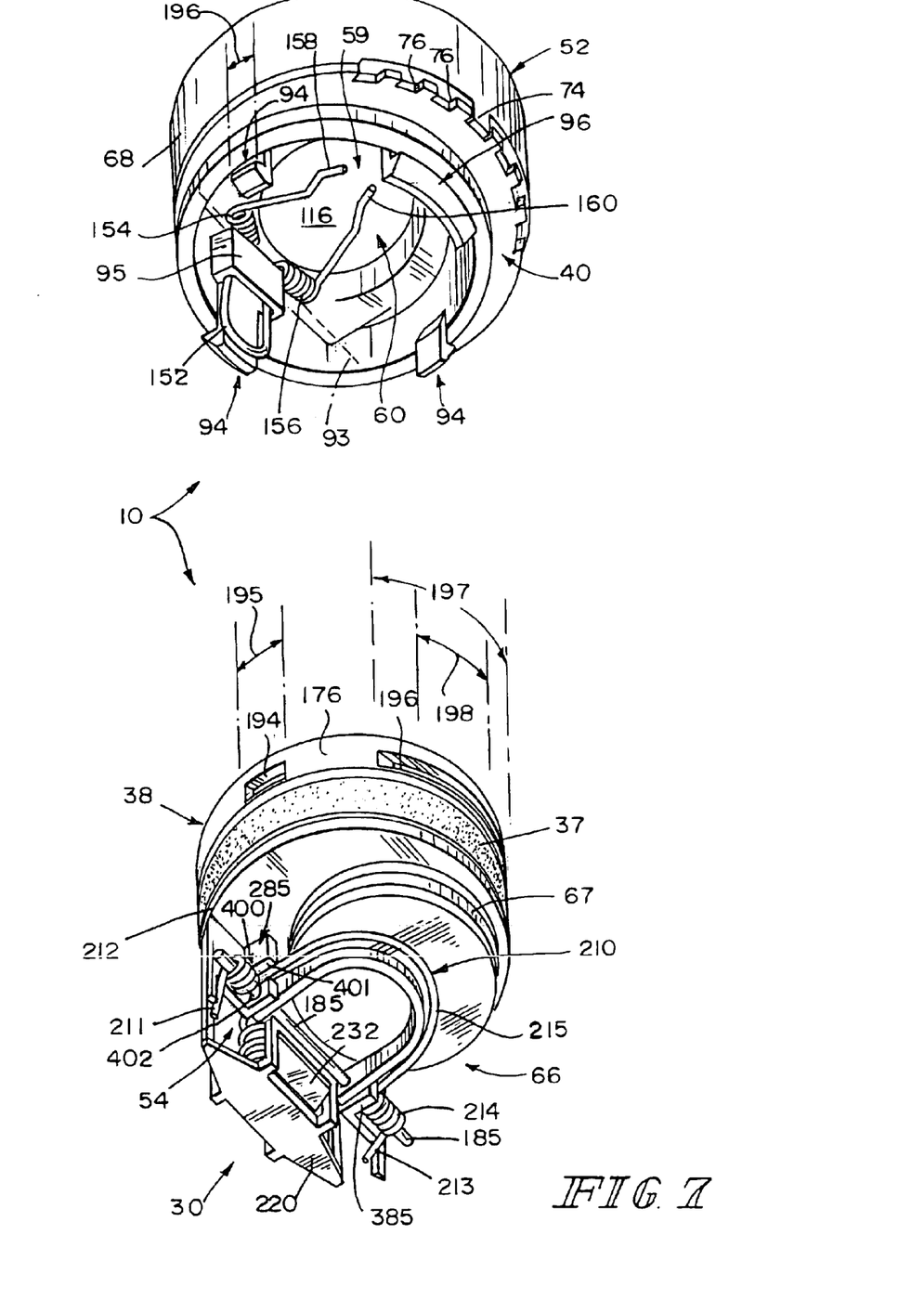
FIG. 7 is a perspective assembly view showing a lower sub-assembly comprising the base and pivotable spring-loaded flapper door before it is mated with a higher sub-assembly comprising the outer body, pivotable spring-loaded appearance door, and outer shell to produce the illustrative filler neck closure assembly shown in FIGS. 1–6.

Outer body 40 includes an outer side wall 78 sized to fit in and mate with annular skirt 68 of outer shell 42, a lower rim 80 including an annular inner side wall 82 extending upwardly toward top wall 56 of outer shell 42, three small fasteners 84 extending downwardly from lower rim 80, and one large fastener 86 extending downwardly from lower rim 80 as suggested in FIGS. 3, 4, and 7. A spaced-apart pair of pivot mounts 88 is coupled to annular inner side wall 82 and arranged to extend into a cavity 90 formed in outer body 40 to support pivot arms 92 appended to appearance door 59 so that appearance door 59 is able to pivot about a pivot axis 93 extending through pivot arms 92 as appearance door 59 moves between opened and closed positions. A spring mount 94 is also provided in cavity 90 of outer body 40 and located midway between pivot mounts 80 to receive a portion of a torsion spring 96 provided to bias outer closure 60 normally to assume the closed position.

Appearance door 59 is shown, for example, in FIGS. 3, 4, 8, and 9. Seal member 61 is "over-molded" onto appearance door 59 to produce outer closure 60 in the manner shown, for example, in FIGS. 8–12.

Figures 8, 9:
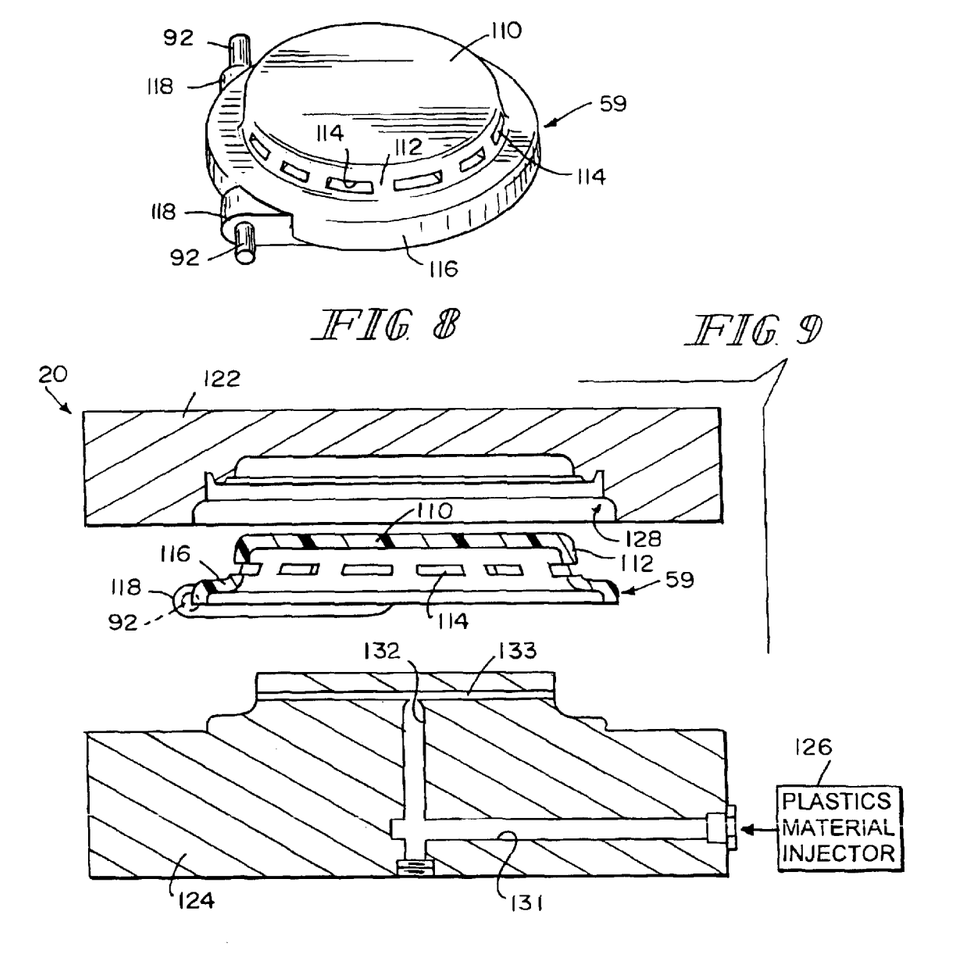
FIG. 8 is a perspective view of an illustrative appearance door.
FIG. 9 is a sectional view of a plastic injection mold having an upper mold portion and a lower mold portion, here shown spaced-apart in an opened position, and also showing the appearance door positioned between the upper and lower mold portions.
Figure 10:
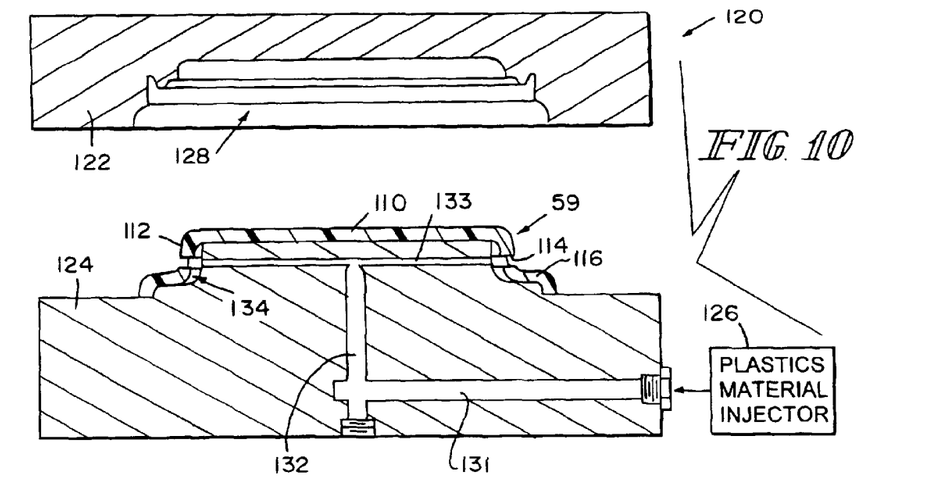
FIG. 10 is a sectional view similar to FIG. 9 showing the appearance door positioned on the lower mold portion.

As suggested in FIGS. 8 and 9, appearance door 59 is made of a plastics material and includes a round top wall 110, an annular upright wall 112 depending from a perimeter edge of top wall 110 and formed to include a plurality of circumferentially spaced-apart tether-receiving holes 114, and an annular lateral wall 116 extending radially outwardly from a perimeter edge of annular upright wall 112. Arm mounts 118 are appended to portions of annular lateral wall 116 and configured to support cantilevered pivot arms 92 thereon as shown, for example, in FIGS. 3 and 8.

Seal member 61 is over-molded onto appearance door 59 to produce outer closure 60 using, for example, an injection mold 120, as suggested in FIGS. 8–12. In this process, appearance door 59 is pre-molded and inserted into injection mold 120 as suggested in FIGS. 9 and 10. Injection mold 120 includes an upper mold portion 122 and a lower mold portion 124. Upper and lower mold portions 122, 124 are movable between an opened position shown in FIG. 10 and a closed position shown in FIG. 11. Lower mold portion 124, for example, is coupled to a plastics material injector 126 provided for injecting liquid plastics material into lower mold portion 124 of injection mold 15.

Figure 11:
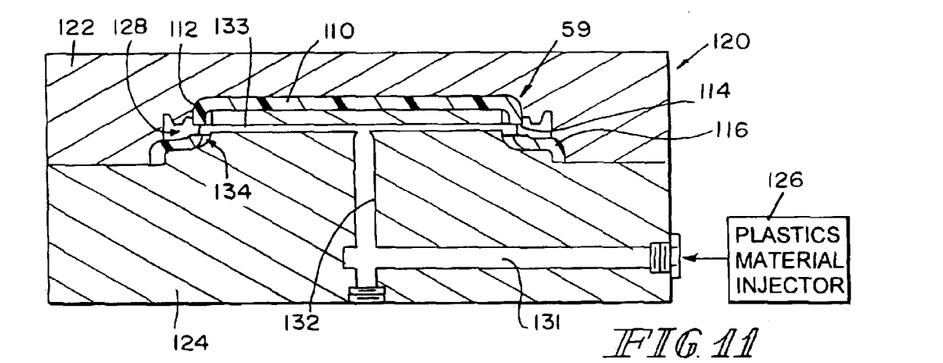
FIG. 11 is a sectional view similar to FIGS. 9 and 10 showing the upper and lower molds in a closed position prior to injection of a plastics material into a mold cavity containing the appearance door.
Figure 12:
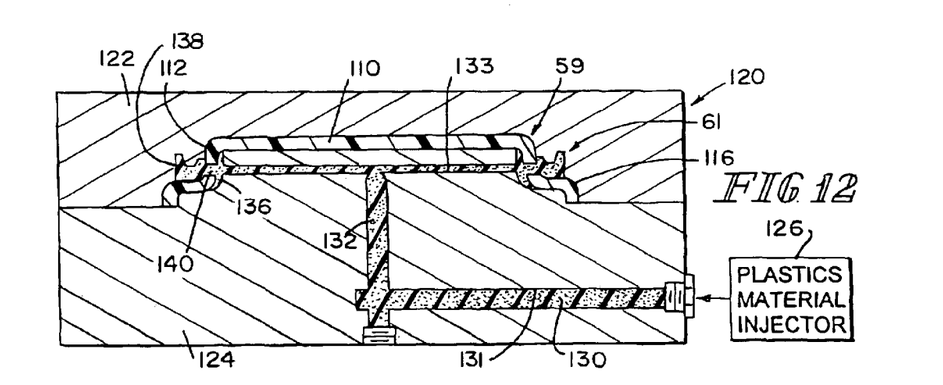
FIG. 12 is a sectional view similar to FIGS. 9–11 showing injection of a plastics material into the mold cavity by a plastics material injector through channels formed in the lower mold portion in order to fill the mold cavity defined by both of the upper and lower mold portions for purpose of "over-molding' plastics material onto the appearance door to form an annular seal on the appearance door.

Upper mold portion 122 is formed to define an appearance door-receiving cavity 128 as shown in FIG. 9. Lower mold portion 124 is formed to include channels 131, 132, 133 for conducting liquid plastics material 130 injected by plastics material injector 126 after mold portions 122, 124 have been moved to the closed position as shown, for example, in Fig. 11 to retain appearance door 59 within mold 120. As shown in FIG. 12, the injected liquid plastics material 130 fills channels 131, 132, 133, an inner cavity 134 defined between appearance door 59 and lower mold portion 124 (as shown in FIG. 11), tether-receiving holes 114 formed in appearance door 59, and an empty portion of cavity 128. The result is that seal member 61 is over-molded onto appearance door 59.

Once cavities formed in upper and lower mold portions 122, 124 have been filled, the liquid plastics material 130 in those cavities is allowed to cool. After the liquid plastics material 130 has cooled to a solid form, a mechanical bond is established between seal member 61 and appearance door 59. Once cooled, upper and lower mold portions 122, 124 are moved to the opened position and outer closure 60 is removed.

Seal member 61 is made of an electrometric material and, as shown, for example, in FIG. 4, includes a base 136 on an interior surface of appearance door 59 (e.g., annular upright wall 112), an annular door seal 138 on an exterior surface of appearance door 59 (e.g., annular upright wall 112 and annular lateral wall 116), and tethers 140 extending through holes 114. Tethers 140 interconnect base 136 and annular door seal 138 and retain annular door seal 138 in place on the exterior surface to mate with top wall 56 upon movement of appearance door 59 to the closed position to establish a sealed connection between appearance door 59 and top wall 56.

As shown best in FIG. 6, top wall 56 of outer shell 42 is formed to include an annular lip 142 extending in an axially inward direction toward bottom wall 62. Annular door seal 138 includes an annular foundation 144 and concentric inner and outer annular rims 146, 148 extending in an axially outward direction from annular foundation 144 to define an annular channel 150 therebetween. Annular lip 142 extends into annular channel 150 to mate with annular foundation 144 and concentric inner and outer annular rims 146, 148 to define a portion of the sealed connection between appearance door 59 and top wall 56. Annular lateral wall 116 of appearance door 59 engages an underside of annular foundation 144 of annular door seal 138.

Torsion spring 96 is used to bias outer closure 60 normally and yieldably to the closed position. As shown, for example, in FIGS. 3, 4, and 7, torsion spring 96 includes a U-shaped anchor 152 interconnecting first and second coils 154, 156, a first arm 158 extending from first coil 154, and a second arm 160 extending from second coil 156. Anchor 152 extends downwardly through a spring anchor receiver 162 formed in spring mount 95 to lie adjacent to an inner side of one of fasteners 94 as suggested, for example, in FIG. 7. First and second arms 158, 160 are biased to engage an inner surface of appearance door 59 as suggested, for example, in FIGS. 4 and 7 normally to move outer closure 60 to assume the closed position.

Partition 44 includes a funnel 164 formed to include an outlet aperture 166 in alignment with inner nozzle-receiving aperture 64 formed in bottom wall 62 of housing 36. An upper surface 168 of funnel 164 defines a lower boundary of outer vent chamber 52. A lower surface 170 of funnel 164 defines an upper boundary of inner vent chamber 50. Partition 44 further includes a funnel support 172 coupled to an upper portion of funnel 164 and arranged to engage a portion of side and bottom walls of base 62 to support funnel 164 in interior region 48 of housing 36. As suggested in FIG. 4, funnel support 172 is coupled to funnel 164 and to base 39 to cause outer vent chamber 52 to lie above funnel 64 and inner vent chamber 50 to lie below funnel 64.

At least one of funnel 164 and funnel support 172 is formed to include vent channel means 53. As suggested in FIGS. 3 and 4, upper portions of funnel 164 and funnel support 172 are formed to include a series of spaced-apart notches which cooperate to define vent channel means 53 to allow flow of air and/or fuel vapor between inner and outer vent chambers 50, 52.

Fasteners 94, 96 are used to couple outer body 40 to base 38 in the embodiment illustrated in FIGS. 1-7. As suggested in FIGS. 3, 4, and 7, a lower portion 176 of the housing side wall extending between top wall 56 and bottom wall 62 of housing 36 is formed to include a fastener receiver opening 194 for each of fasteners 94 and a fastener receiver opening 196 for fastener 96. Each of fasteners 94, 96 extends into its companion fastener receiver opening 194, 196 to retain outer body 40 in a fixed position on base 38 without occluding the fastener receiver opening to cause an unoccluded portion of the fastener receiver opening to define a vent port 178 to allow flow of gas (e.g., ambient air or pressurized fuel vapor) into and out of outer vent chamber 52 through vent ports 178. As suggested in FIG. 7, fastener receiver opening 194 has a width 195 that is wider than the width 196 of fastener 94 and fastener receiver opening 196 has a width 197 that is wider than the width 198 of fastener 96. It is within the scope of this disclosure to provide vent ports to communicate flow of ambient air into and out of vent chamber 52, which vent ports are separated from fasteners 94, 96.

As shown in FIG. 4, annular seal 65 includes concentric first and second seal rings 181, 182 arranged to contact flapper door 66 upon movement of flapper door 66 to the closed position to establish an annular seal between housing 36 and flapper door 66. Flapper door 66 includes pivot arms 184 mounted to pivot on a pivot shaft 185 associated with base 38, a raised dome 186 including a top wall 187 facing toward a bottom wall 62 of base 38 and an annular side wall 188 extending a direction away from bottom wall 62, and a dome support 189 interposed between pivot arms 184 and raised dome 186. First seal ring 181 has a first profile height and is arranged to contact top wall 187 of raised dome 186. Second seal ring 182 has a second profile height greater than the first profile height (as shown in FIG. 4) and is arranged to contact at least annular side wall 188 of raised dome 186. Annular seal 65 also includes an annular flange 189 gripped by seal retainer 67. An inclined nozzle-engaging surface 190 is appended to raised dome 186 to contact pump nozzle 24 during opening of flapper door 66.

A torsion spring 210 is provided to bias flapper door 66 normally and yieldably to the closed position. As shown in FIG. 3, torsion spring 210 includes first arm 211, first coil 212, second arm 213, second coil 214, and a U-shaped pusher 215 interconnecting first and second coils 212, 214. First and second coils 212, 214 are mounted on pivot shaft 185 and arranged to locate both pivot arms 184 therebetween as suggested in FIG. 7.

Base 38 of housing 36 includes first and second shaft mounts 285, 385 as shown, for example, in FIG. 3. Each shaft mount 285, 385 is adapted to be coupled to pivot shaft 185 to support pivot shaft 185 for movement relative to shaft mounts 285, 385 as suggested, for example, in FIGS. 4–7.

Each shaft mount 285, 385 includes a slot 400 adapted to receive pivot shaft 185 therein so as to provide a "shaft receiver." In the illustrated embodiment, slot 400 is L-shaped and includes a horizontally extending entry portion 401 and a vertically extending shaft-retainer portion 402 as shown, for example, in FIGS. 3–7 and 16–19. During assembly, pivot shaft 185 is moved through entry portion 401 to reach shaft-retainer portion 402. Once pivot shaft 185 is located in shaft-retainer portion 402, flapper door 66 can be pivoted about a longitudinal axis of pivot shaft 185 between opened and closed positions. Vertically extending shaft-retainer portion 402 is sized and configured to allow flapper door 66 to "float" in up-and-down vertical directions so as to seal or otherwise mate properly with annular seat 65. Ease of assembly is promoted owing to the location of shaft mounts 285, 385 on the underside of housing 36 and accessibility of openings into entry portions 401 formed in shaft mounts 285, 385.

Vacuum-relief apparatus 30 includes a spring retainer 220 including a floor 222 carrying an upstanding spring post 224 and a pair of upstanding spaced-apart side walls 226, 228 formed to include fastener receivers to mate with fasteners 230, 232 included in housing 36 and depending from bottom wall 62 of base 38 as suggested in FIGS. 3 and 4. A vacuum-relief valve 234 is mounted to move up and down in vent passage 54 and include a seal member 236 and a seal carrier 238. A spring 240 is positioned to lie in vent passage 54 centered in part by spring post 224 to engage seal carrier 238 and floor 222 normally to urge seal member 236 to engage a valve seat formed on bottom wall 62 of base 38 to close an aperture 242 opening into inner vent chamber 50. Funnel 164 of partition 44 is arranged to overlie aperture 242 to shield components included in vacuum-relief apparatus 30 from exposure to contaminants admitted inadvertently into outer vent chamber 52.

Owing to the modularity of partition 44, assembly 10 can be configured easily to accept small-diameter unleaded fuel-dispensing pump nozzles or larger-diameter diesel fuel-dispensing pump nozzles. Assembly 10 can be adapted to work with either style of pump nozzle by manufacturing assembly 10 to include a partition 44 configured to work with the desired style of pump nozzle. During manufacture, partition 44 is selected from a group comprising a first partition including a funnel formed to include a narrow-diameter outlet aperture associated with a n unleaded fuel-dispensing pump nozzle and a second partition including a funnel formed to include a relatively larger large-diameter outlet aperture associated with a diesel fuel-dispensing pump nozzle.

Figure 13:
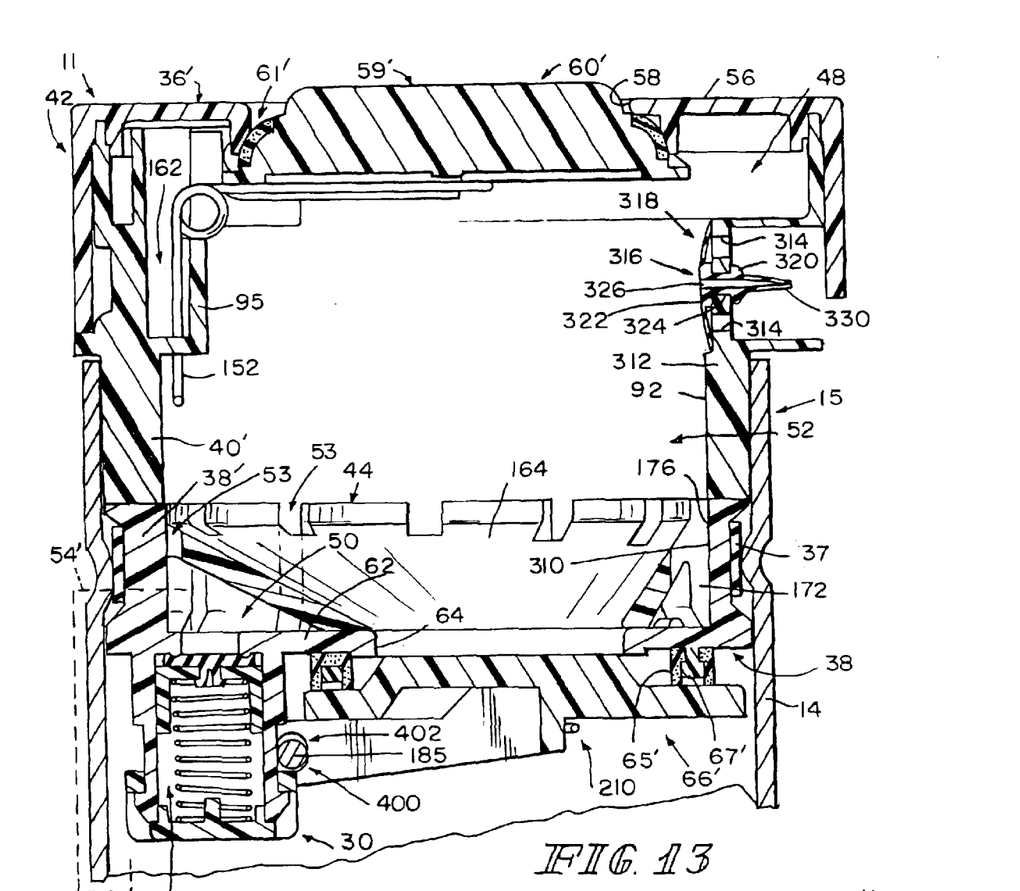
FIG. 13 is a sectional view similar to FIG. 4 showing alternative embodiments of an outer body "welded" to a base to form a housing having an interior region containing a partition, an "over-molded" annular seal for the appearance door, a small-diameter annular seal sized to mate with the flapper door, and a seal retainer, and showing a pressure/vacuum-relief valve mounted on the outer body to regulate pressure in the outer vent chamber.
Figure 14:
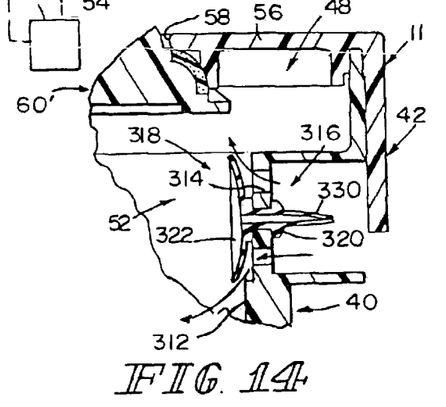
FIG. 14 is a sectional view of the pressure/vacuum-relief valve of FIG. 13 showing an umbrella-style vacuum-relief valve in an opened position to admit ambient air into the outer vent chamber.
Figure 15:
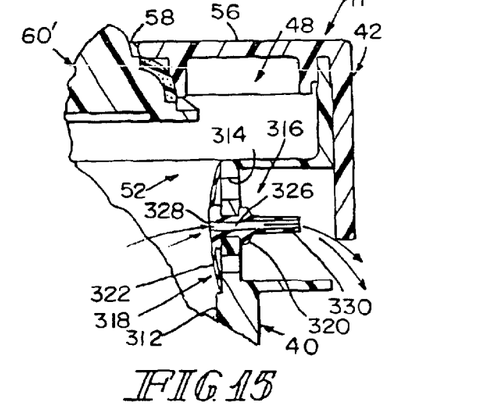
FIG. 15 is a view similar to FIG. 14 showing a duckbill-style pressure-relief valve in an opened position to discharge pressurized fuel vapor from the outer vent chamber.
Figure 16:
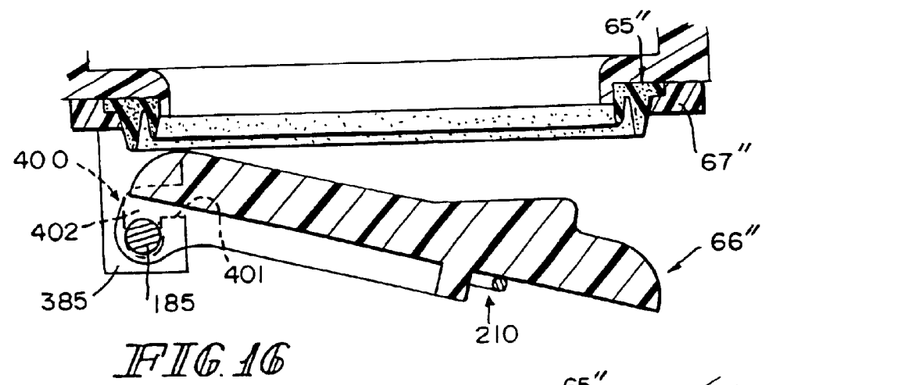
FIG. 16 is a partial sectional view of another embodiment of an annular seal held in place by a retainer and arranged to mate with a movable flapper door.
Figure 17:
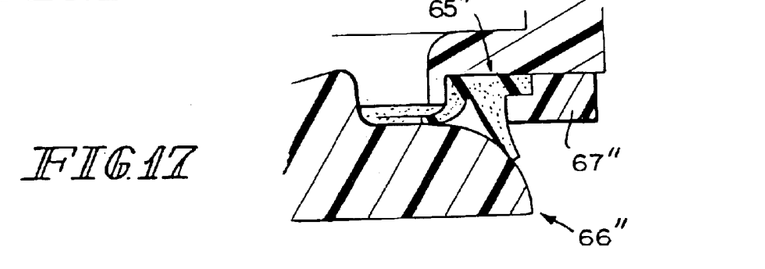
FIG. 17 is an enlarged view of a portion of the section shown in FIG. 16 showing mating engagement of the annular seal and the flapper door.
Figure 18:
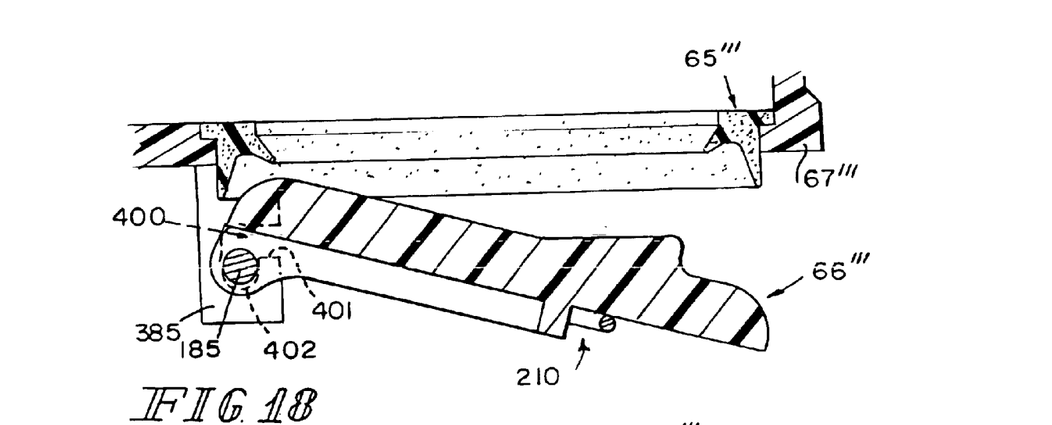
FIG. 18 is a view similar to FIG. 16 of yet another embodiment of an annular seal arranged to mate with a movable flapper door.
Figure 19:
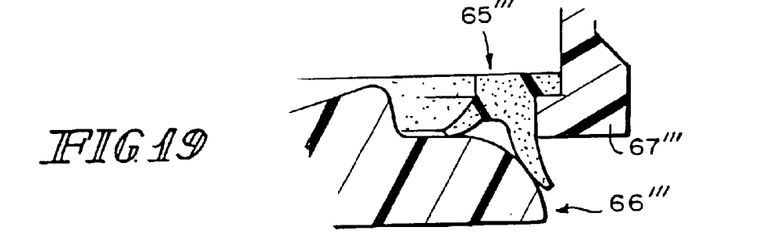
FIG. 19 is an enlarged view of a portion of the section shown in FIG. 18 showing mating engagement of the annular seal and the flapper door.

As shown in FIGS. 13–15, filler neck closure assembly 11 includes a base 38' welded to outer body 40' to define a housing. Outer closure 60' includes a seal member 61' coupled to appearance door 59'. Flapper door 66' is arranged to mate with first and second rings included in annular seal 65', which seal 65' is retained in place on bottom wall 62 by seal retainer 67'. Housing 36' includes a base 38' including bottom wall 62 and a lower portion 176 of a housing side wall and an outer body 40+ including an upper portion 312 of the housing side wall and a vent port 314 is formed in upper portion 312 of the side wall. In the illustrated embodiment, a vertically extending shaft-retainer portion 402' of slot 400' is formed in flapper door 66' and arranged to receive pivot shaft 185.

A flow control valve assembly 316 is configured normally to close vent port 314 to regulate pressure of air and fuel vapor in outer vent chamber 52. In the illustrated embodiment, several vent ports 314 are provided. By using flow control valve assembly 316, it is possible to control and regulate pressure conditions in outer vent chamber 52 more precisely in a way that is useful in certain vehicle emission regulatory environments.

Flow control valve assembly 316 includes an umbrella vacuum-relief valve 318 having a stem 320 coupled to upper portion 312 of the side wall and a valve member 322 located in interior region 48 of housing 36 and movable from a normally closed position closing vent port 314 as shown in FIGS. 13 and 15 to an opened position opening vent port 314, as shown in FIG. 14, upon development of a negative pressure in interior region 48 that is below a selected pressure threshold level. Upper portion 312 of the side wall is formed to include a mounting hole 324 alongside vent port 314. Stem 320 is arranged to extend through mounting hole 324 and is formed to include a pressure-relief passageway 326 having an opening 328 formed in valve member 322. A duck-bill pressure-relief valve 330 is coupled to stem 320 and configured normally to close pressure-relief passageway 326 to block discharge of fuel vapor from outer vent chamber 32 through pressure-relief passageway 326 until pressure of the fuel vapor extant in outer vent chamber 52 exceeds a selected threshold level. In the illustrated embodiment, flow control valve assembly 316 includes a vacuum-relief valve and a pressure-relief valve.

Umbrella vacuum-relief valve 318 is useful when used with a particular vapor-recovery fuel-dispensing pump nozzle which draws a vacuum on the filler neck while sealing the upper end. The umbrella valve provides make-up air to prevent excessive vacuum and premature nozzle shut-offs. The duck-bill pressure-relief valve 330 in the center provides a vent passage when outer closure 60 is closed and the pressure-relief valve is activated.

Alternative annular seals and flapper door designs are shown in FIGS. 16–19. As suggested in FIGS. 16 and 17, flapper door 66″ mates with a normally unsplayed annular seal 65″ held in place by seal retainer 67″. As suggested in FIGS. 18 and 19, flapper door 66′″ mates with a normally splayed annular seal 65′″ held in seal retainer 67′″. In each case, pivot shaft 185 is retained in slots 400 in shaft mounts 285, 385.

What is claimed is:

1. A filler neck closure assembly for a vehicle fuel tank filler neck, the assembly comprising a housing adapted to be coupled to a fuel tank filler neck to receive a fuel-dispensing pump nozzle during fuel tank refueling, the housing including a top wall formed to include an outer nozzle-receiving aperture, a bottom wall formed to include an inner nozzle-receiving aperture adapted to open into the fuel tank filler neck when the housing is coupled to the fuel tank filler neck, and a side wall arranged to extend between the top and bottom walls to define an interior region of the housing, the housing including an outer closure mounted for movement relative to the top wall to open and close the outer nozzle-receiving aperture and a flapper door mounted for movement relative to the bottom wall to open and close the inner nozzle-receiving aperture, the housing further including a vent passage having an outer end opening into the interior region and an inner end adapted to open into the fuel tank filler neck when the housing is coupled to the fuel tank filler neck, a partition arranged to divide the interior region of the housing into an outer and inner vent chamber, the outer vent chamber communicating with the outer and inner nozzle-receiving apertures and defining a pump nozzle-receiving passageway adapted to receive the pump nozzle therein during movement of a pump nozzle through the outer and inner nozzle-receiving apertures to move the outer closure and flapper door to opened positions during fuel tank refueling, the inner vent chamber communicating with the vent passage, the partition is formed to include a vent channel to place the outer and inner vent chambers in fluid communication, the housing being formed to include a vent port to admit ambient air outside of the housing into the outer vent chamber when the outer closure and flapper door have been moved to closed positions, and a flow control valve assembly yieldably biased normally to close the vent passage to regulate flow of a gas through the vent passage.

2. The assembly of claim 1, wherein the partition includes a funnel formed to include an outlet aperture in alignment with the inner nozzle-receiving aperture formed in the bottom wall of the housing, an upper surface defining a lower boundary of the outer vent chamber, and a lower surface defining an upper boundary of the inner vent chamber.

3. The assembly of claim 2, wherein the partition farther includes a funnel support coupled to an upper portion of the funnel and arranged to engage a portion of the side and bottom walls in the housing to support the funnel in the interior region of the housing.

4. The assembly of claim 3, wherein at least one of the funnel and funnel support is formed to include the vent channel.

5. The assembly of claim 1, wherein the housing includes a base including the bottom wall and a lower portion of the side wall and an outer body including an upper portion of the side wall and the vent port is formed in the upper portion of the side wall.

6. The assembly of claim 5, further comprising a flow control valve assembly configured normally to close the vent port to regulate pressure of air and fuel vapor in the outer vent chamber.

7. The assembly of claim 6, wherein the flow control valve assembly includes a vacuum-relief valve having a stem coupled to the upper portion of the side wall and a valve member located in the interior region of the housing and movable from a normally closed position closing the vent port to an opened position opening the vent port upon development of a negative pressure in the interior region that is below a selected pressure threshold level.

8. The assembly of claim 7, wherein the upper side wall is formed to include a mounting hole alongside the vent port, the stem is arranged to extend through the mounting hole and is formed to include a pressure-relief passageway having an opening formed in the valve member, and a pressure-relief valve is coupled to the stem and configured normally to close the pressure-relief passageway to block discharge of fuel vapor from the outer vent chamber through the pressure-relief passageway until pressure of the fuel vapor extant in the outer vent chamber exceeds a selected threshold level.

9. The assembly of claim 6, wherein the flow control valve assembly includes a vacuum-relief valve and a pressure-relief valve.

10. The assembly of claim 5, wherein the partition is mounted in a cavity formed in the base.

11. The assembly of claim 5, wherein the partition includes a funnel formed to include an outlet aperture in alignment with the inner nozzle-receiving aperture formed in the bottom wall of the housing and a funnel support coupled to the funnel and to the base to cause the outer vent chamber to lie above the funnel and the inner vent chamber to lie below the funnel.

12. The assembly of claim 11, wherein the lower side wall of the base and at least one of the funnel and funnel support cooperate to define the vent channel therebetween.

13. The assembly of claim 1, wherein the housing includes a base including the bottom wall and a lower portion of the side wall and an outer body including an upper portion of the side wall and the vent port is formed at a junction between the base and the outer body.

14. The assembly of claim 13, wherein the lower portion of the side wall included in the base is formed to include a fastener receiver opening, the outer body further includes a fastener extending downwardly away from the upper portion of the side wall included in the outer body, and the fastener extends into the fastener receiver opening to retain the outer body in a fixed position on the base without occluding the fastener receiver opening to cause an unoccluded portion of the fastener receiving opening to define the vent port.

15. The assembly of claim 1, wherein the housing includes a base including the bottom wall and a lower portion of the side wall and an outer body including an upper portion of the side wall, and wherein the partition is mounted in a cavity formed in the base before the lower portion of the side wall included in the base is welded to the upper portion of the side wall included in the outer body to define the interior region formed in the housing and containing the partition.

16. The assembly of claim 15, wherein the partition is selected from a group comprising a first partition including a funnel formed to include a narrow-diameter outlet aperture associated with an unleaded fuel-dispensing pump nozzle and a second partition including a funnel formed to include a relatively larger large-diameter outlet aperture associated with a diesel fuel-dispensing pump nozzle.

17. The assembly of claim 1, wherein the outer closure includes an appearance door coupled to the side wall for pivotable movement about a pivot axis between opened and closed positions and an outer seal coupled to the appearance door, the appearance door including an interior surface, an exterior surface, and a plurality of holes extending between the interior and exterior surfaces, the outer seal is made of an elastomeric material and includes a base on the interior surface, an annular door seal on the exterior surface, and tethers extending through the holes to interconnect the base and the annular door seal and retain the annular door seal in place on the exterior surface to mate with the top wall upon movement of the appearance door to the closed position to establish a sealed connection between the appearance door and the top wall.

18. The assembly of claim 17, wherein the top wall is formed to include an annular lip extending in an axially inward direction toward the bottom wall, the annular door seal includes an annular foundation and concentric inner and outer annular rims extending in an axially outward direction from the annular foundation to define an annular channel therebetween, and the annular lip extends into the annular channel to mate with the annular foundation and the concentric inner and outer annular rims to define a portion of the sealed connection between the appearance door and the top wall.

19. The assembly of claim 18, wherein the appearance door includes a top wall, an annular upright wall depending from a perimeter edge of the top wall and engaging a radially inwardly facing surface of the inner annular rim, and an annular lateral wall extending radially outwardly from a perimeter edge of the annular upright wall and engaging an underside of the annular foundation.

20. The assembly of claim 17, wherein the appearance door includes a top wall, an annular upright wall arranged to depend from a perimeter edge of the top wall and formed to include the plurality of holes receiving the tethers, and an annular lateral wall extending radially outwardly from a perimeter edge of the annular upright wall and engaging an underside of the annular door seal.

21. The assembly of claim 1, further comprising an annular seal including concentric first and second seal rings arranged to contact the flapper door upon movement of the flapper door to the closed position to establish an annular seal between the housing and the flapper door and a seal retainer coupled to the housing and arranged to retain the annular seal in sealing engagement with the bottom wall of the housing in a position surrounding the inner nozzle-receiving aperture.

22. The assembly of claim 21, wherein the flapper door includes a pivot arm mounted to pivot on a pivot shaft associated with the base, a raised dome including a top wall facing toward the bottom wall of the base and an annular side wall extending in a direction away from the bottom wall of the base, and a dome support interposed between the pivot arm and the raised dome, and wherein the first seal ring is arranged to contact the top wall of the raised dome and the second seal ring is arranged to contact the annular side wall of the raised dome when the flapper door is moved to assume the closed position.

23. A filler neck closure assembly for a vehicle fuel tank filler neck, the assembly comprising a housing formed to include an interior region, an outer nozzle-receiving aperture opening into the interior region, an inner nozzle-receiving aperture aligned with the outer nozzle-receiving aperture and opening into the interior region, a vent port arranged to allow gas flow into and out of the interior region, and a vent passage having an outer end opening into the interior region and an inner end adapted to open into the fuel tank filler neck when the housing is coupled to the fuel tank filler neck, the housing including an outer closure mounted for movement to open and close the outer nozzle-receiving aperture and a flapper door mounted for movement to open and close the inner nozzle-receiving aperture, and a partition configured to include funnel means for guiding a moving fuel-dispensing pump nozzle admitted into the interior region through the outer nozzle-receiving aperture into the inner nozzle-receiving opening to move the flapper door to open the inner nozzle-receiving aperture, the partition being arranged to divide the interior region into an inner vent chamber communicating with the vent passage and an outer vent chamber communicating with the outer and inner nozzle-receiving apertures and the vent port, the partition also being formed to include a vent channel to place the outer and inner vent chambers in fluid communication.

24. The assembly of claim 23, further comprising a flow control valve assembly yieldably biased normally to close the vent passage to regulate flow of a gas through the vent passage.

25. The assembly of claim 24, wherein the flow control valve assembly includes a vacuum-relief valve located in the vent passage and a spring arranged to move the vacuum-relief valve normally to block flow of gas from the inner vent chamber into the vent passage.

26. The assembly of claim 25, further comprising a pressure/vacuum relief valve assembly yieldably biased normally to close the vent port to regulate flow of a gas through the vent port to regulate pressure of air and fuel vapor in the outer vent chamber.

27. The assembly of claim 24, wherein the flow control valve assembly includes pressure-relief means for normally blocking flow of pressurized fuel vapor from the vent passage into the inner vent chamber until the pressure of the pressurized fuel vapor in the vent passage exceeds a selected threshold level so that once the selected threshold level is exceeded pressurized fuel vapor flows from vent passage through inner vent chamber, channel, outer vent chamber, and vapor port to exit the interior region of the housing.

28. The assembly of claim 23, wherein the partition further includes a sleeve arranged to engage an inner wall of the housing to orient the funnel means to cause an outlet aperture defined by the funnel means to be aligned with the inner nozzle-receiving opening.

29. The assembly of claim 28, wherein a portion of the sleeve is formed to include a portion of the channel.

30. The assembly of claim 29, wherein a portion of the funnel means is formed to include another portion of the channel.

31. The assembly of claim 23, wherein the channel is defined by a plurality of circumferentially spaced-apart notches formed in an axially outer portion of the partition at a junction between the inner and outer vent chambers.

* * * * *